(No Model.)

F. C. GEIGER.
CULTIVATOR.

No. 374,469. Patented Dec. 6, 1887.

WITNESSES.
John F. Nelson.
Emma Arthur.

INVENTOR.
Francis C. Geiger.
By Knight Bros
Attys.

UNITED STATES PATENT OFFICE.

FRANCIS C. GEIGER, OF ROCKPORT, WEST VIRGINIA.

CULTIVATOR.

SPECIFICATION forming part of Letters Patent No. 374,469, dated December 6, 1887.

Application filed July 26, 1887. Serial No. 245,340. (No model.)

*To all whom it may concern:*

Be it known that I, FRANCIS C. GEIGER, a citizen of the United States, residing at Rockport, in the county of Wood and State of West Virginia, have invented certain new and useful Improvements in Cultivators, of which the following is a specification.

My present invention is designed as an improvement over the device covered by United States Letters Patent No. 365,252, granted to me June 21, 1887; and it consists in placing between the two shovels of a double-shovel plow—such as described and claimed in said patent—a supplemental shovel which is detachable from the implement.

It will be seen that the implement shown in this application is, like that of my former patent, capable of being contracted, so as to accommodate itself to most any width of row; and it will be noted that when the shovels are at their farthest distance apart the space between them is so great that they are incapable of tilling the soil midway between them. Therefore, the object of my present invention is to obviate this difficulty, which I accomplish by the means before mentioned.

I will now describe my invention with reference to the accompanying drawings, and then point it out more specifically in the claims.

Figure 1:
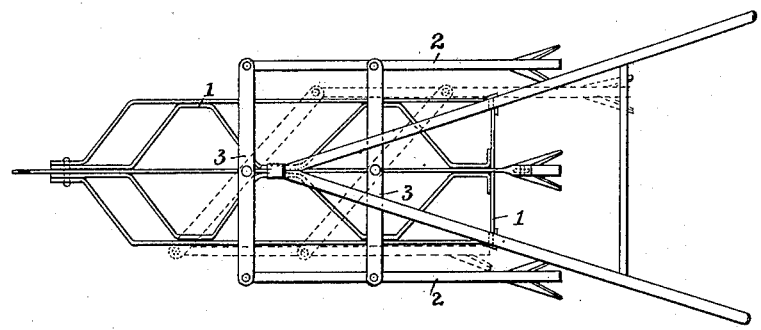
Figure 2:
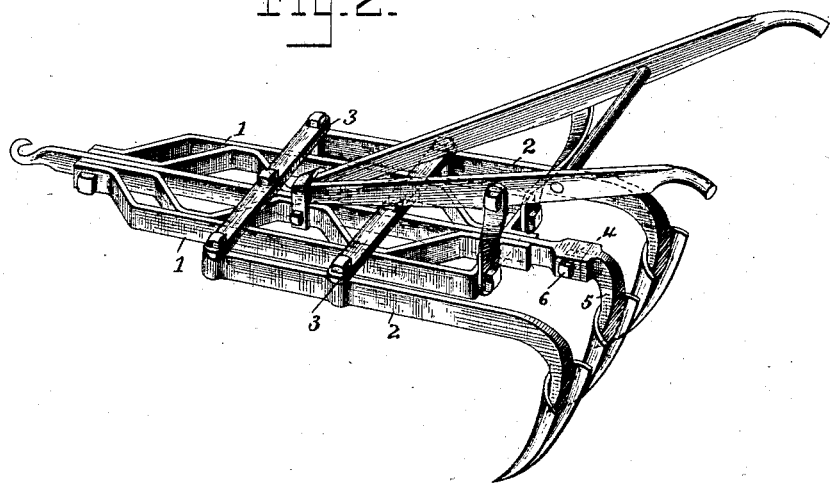

In said drawings, Figure 1 is a plan view of a cultivator having my improvements applied thereto, showing by dotted lines the implement in a contracted condition. Fig. 2 is a perspective view.

1 is the rigid frame of the implement, having the handles secured thereto in any suitable and usual manner.

2 2 are the side beams carrying the shovels at their rear ends, and pivoted at their forward ends and mid-length, and pivoted cross-bars 3 3, by which arrangement it will be seen that the outside shovels may be drawn closer to the center beam of the implement. The rear end of the center beam terminates in a socket, 4, which may be of any suitable construction, and into which the supplemental shovel 5 may, when it is desired, be inserted and secured against displacement by a bolt, 6, which passes through the socket and shovel-shank, or it may be secured by any other well-known and suitable means.

When the implement is to be used in its contracted position, the supplemental shovel may be detached, and when in the reverse position attached to the implement again, or the three shovels may be used with the machine in a contracted or expanded condition; but in either case the soil will be thoroughly comminuted throughout the entire expanse of the cultivator.

Having thus described my invention, the following is what I claim as new therein and desire to secure by Letters Patent:

1. The combination of a rigid frame, 1, side beams, 2 2, having shovels, pivoted cross-bars 3 3, by which the side beams are hinged to the frame, the central draft-beam, and a shovel, 5, substantially as described and shown.

2. The combination, with the rigid frame, side beams having cultivator-teeth, and cross-bars pivoted to said side beams and to the rigid frame, of the socket 4 and a cultivator tooth or shovel, 5, secured in said socket by means of a bolt, substantially as and for the purpose set forth.

FRANCIS C. GEIGER.

Witnesses:
F. M. WORK,
E. P. LANG.